United States Patent
Cotte et al.

(10) Patent No.: US 11,995,605 B2
(45) Date of Patent: May 28, 2024

(54) SYSTEM FOR ROUTING OBJECTS WITH SIMPLIFIED ROUTING CYCLE INITIATION

(71) Applicant: PA.COTTE SA, Pully (CH)

(72) Inventors: Pierre-Alain Cotte, Amberg (DE); Thomas Nansot, Nantes (FR)

(73) Assignee: PA.COTTE SA, Pully (CH)

( * ) Notice: Subject to any disclaimer, the term of this patent is extended or adjusted under 35 U.S.C. 154(b) by 188 days.

(21) Appl. No.: 17/295,308

(22) PCT Filed: Nov. 15, 2019

(86) PCT No.: PCT/EP2019/081559
§ 371 (c)(1),
(2) Date: May 19, 2021

(87) PCT Pub. No.: WO2020/104340
PCT Pub. Date: May 28, 2020

(65) Prior Publication Data
US 2022/0012685 A1    Jan. 13, 2022

(30) Foreign Application Priority Data

Nov. 23, 2018  (FR) ........................... 1871794

(51) Int. Cl.
*G06Q 10/083* (2023.01)
*B65D 55/02* (2006.01)
(Continued)

(52) U.S. Cl.
CPC ......... *G06Q 10/0838* (2013.01); *B65D 55/02* (2013.01); *G06F 16/285* (2019.01);
(Continued)

(58) Field of Classification Search
CPC ........... G06Q 10/0838; G06Q 10/0833; G06Q 10/08355; G06F 16/285; B65D 55/02;
(Continued)

(56) References Cited

U.S. PATENT DOCUMENTS 6,961,711 B1 * 11/2005 Chee ..................... G07F 7/00
                                                        705/26.1
9,846,854 B1 * 12/2017 Lee ................ G06Q 10/0833
(Continued)

FOREIGN PATENT DOCUMENTS

| CN | 107270604 | 10/2017 |
| CN | 107491917 | 12/2017 |

(Continued)

OTHER PUBLICATIONS

J. Sa-ngiampak et al., "LockerSwarm: An IoT-based Smart Locker System with Access Sharing," 2019 IEEE International Smart Cities Conference (ISC2), Casablanca, Morocco, 2019, pp. 587-592, https://ieeexplore.ieee.org/abstract/document/9071664 (Year: 2019).*
(Continued)

*Primary Examiner* — Shannon S Campbell
*Assistant Examiner* — Lisa Ma
(74) *Attorney, Agent, or Firm* — Faegre Drinker Biddle & Reath LLP

(57) ABSTRACT

A system for routing objects includes:
  packages integrating first wireless communication means; and
  a computing platform including at least one database.
The computing platform is parameterized to digitally track the time-stamped geolocation of each package from a start-of-routing cycle instruction. Each package carries an electronic actuator coupled to the first wireless communication means in order to emit a first signal to the computing platform, the first signal being interpreted by the computing platform as a start-of-routing cycle instruction.

15 Claims, 7 Drawing Sheets

(51) Int. Cl.
*G06F 16/28* (2019.01)
*G06Q 10/0833* (2023.01)
*G06Q 10/0835* (2023.01)
*H04W 4/029* (2018.01)

(52) U.S. Cl.
CPC ... *G06Q 10/0833* (2013.01); *G06Q 10/08355* (2013.01); *H04W 4/029* (2018.02)

(58) Field of Classification Search
CPC ....... H04W 4/029; H04W 4/023; H04W 4/50; H01Q 1/225
USPC ........................................................ 705/333
See application file for complete search history.

(56) References Cited

U.S. PATENT DOCUMENTS

| | | | | |
|---|---|---|---|---|
| 10,108,898 | B1* | 10/2018 | Ballam | G06K 19/07798 |
| 10,657,486 | B1* | 5/2020 | Wolter | G06Q 10/0833 |
| 2002/0038224 | A1* | 3/2002 | Bhadra | G06Q 10/08 705/402 |
| 2012/0173448 | A1* | 7/2012 | Rademaker | G06Q 10/083 705/338 |
| 2014/0279596 | A1* | 9/2014 | Waris | G06Q 10/08355 705/317 |
| 2016/0066733 | A1 | 3/2016 | Gozar | |
| 2017/0228951 | A1 | 8/2017 | Foot | |
| 2018/0004202 | A1* | 1/2018 | Onaga | H04L 67/125 |
| 2018/0033235 | A1* | 2/2018 | Dotterweich | G07F 17/12 |
| 2018/0121873 | A1* | 5/2018 | Walsh | G06Q 10/0836 |
| 2018/0174099 | A1* | 6/2018 | Winkle | G07C 9/00896 |
| 2018/0225949 | A1* | 8/2018 | Mowatt | G06F 16/951 |
| 2018/0286205 | A1* | 10/2018 | Batra | G08B 25/10 |
| 2018/0336515 | A1* | 11/2018 | Mehring | H04L 9/0637 |
| 2019/0196479 | A1* | 6/2019 | Kaneko | G06Q 50/00 |
| 2020/0387863 | A1* | 12/2020 | Ruth | G06Q 10/087 |

FOREIGN PATENT DOCUMENTS

| | | | |
|---|---|---|---|
| EP | 3438576 | | 2/2019 |
| WO | WO-2023018713 A1 | * | 2/2023 |

OTHER PUBLICATIONS

International Search Report and Written Opinion issued by the European Patent Office, dated Jan. 16, 2020, for International Patent Application No. PCT/EP2019/081559; 15 pages.

Néstor Álvarez-Díaz, et al. "Smart Contracts based on Blockchain for Logistics Management", In IML'17: International Conference on Internet of Things and Machine Learning, Oct. 17-18, 2017, Liverpool, UK, ACM, New York, NY, USA, https://doi.org/10.1145/310976.3158384; 8 pages.

English translation of the Written Opinion of the International Searching Authority, dated Jan. 16, 2020, in International Patent Application No. PCT/EP2019/081559; 7 pages.

* cited by examiner

SYSTEM FOR ROUTING OBJECTS WITH SIMPLIFIED ROUTING CYCLE INITIATION

CROSS-REFERENCE TO RELATED APPLICATIONS

The present application is a national stage entry of International (PCT) Patent Application Number PCT/EP2019/081559, filed Nov. 15, 2019, which claims priority to French Patent Application No. 1871794, filed Nov. 23, 2018, the subject matter of each is expressly incorporated herein by reference.

The field of the invention is that of the logistics. More specifically, the invention relates to the routing of objects, and more specifically objects generally from e-commerce platforms, or transferred from one private individual to another.

As such, the invention relates to a system for routing objects whose weight preferably does not exceed 5 kg.

Of course, the invention also applies to objects of smaller dimension and/or weight, up to dispatching single covers.

The system according to the invention is based on a routing by players in a supply chain, for example a professional supply chain. The players are therefore transport professionals.

To a lesser extent, the players can be private individuals taking advantage of the opportunity of their personal travel to ensure the routing of one or several object(s).

This system for routing objects by the players comprises:
packages forming containers for the transport of the objects;
a computing platform including at least one database;
a plurality of computer units held by the players,
a computer application intended to be loaded by each computer unit.

When using the system, an individual or a person wishing to send or route an object from a first point to an arrival point, notifies via the computer application or via a website the departure coordinates of the package and the arrival coordinates of the package which are recorded in a database of the computing platform.

Once the coordinates have been entered and all the routing information recorded, the user inserts the object(s) to be routed into the package then locks the package and notifies that the package is locked by the computer application of his computer unit. This has the effect of issuing a removal request to the computing platform which transmits this request to the players via a computing cloud. The package locking notification is in particular made by a direct exchange between the package and the mobile application of the computer unit of the user.

When a player wishes to respond favorably to the routing request, he notifies the computing platform, via the application of his computer unit, that the package has been handled.

During the routing, several players can become responsible for the package until the latter reaches its final destination.

Once at the delivery point, the player in charge of the package notifies the computing platform, via the computer application of his computer unit, that he has delivered the parcel.

The package can then be opened by the recipient in order to retrieve the object(s) it contains.

The package then becomes free to use again, either to be returned to a storage place or to be used as package for a new routing.

Such a method is satisfactory but remains however perfectible.

Indeed, the handling time and the processing time prior to the routing of the objects is relatively long and can be advantageously reduced.

Particularly, it is necessary for each player participating in the routing, and particularly for the first player initiating the routing, to use a computer interface making it possible to communicate with the computing platform.

The objective of the invention is in particular to overcome the drawbacks of the prior art.

More specifically, the objective of the invention is to propose a system for routing objects by players that is simple and fast to implement.

In this sense, the objective of the invention is to provide such a system which allows eliminating the systematic recourse to a computer interface in order to communicate with the computing platform.

The objective of the invention is also to provide such an object routing system that is safe in terms of protection of the object(s) to be transported.

The objective of the invention is also to provide such a routing system that is fast and whose impact on the environment is measured.

These and other objectives which will appear later are achieved thanks to the invention which relates to a system for routing objects, comprising:
packages integrating first wireless communication means;
a computing platform including at least one database grouping together, for each package, information of a routing cycle;
the computing platform being parameterized to digitally track the time-stamped geolocation of each package from a start-of-routing cycle instruction,
characterized in that each package carries an electronic actuator coupled to the first wireless communication means in order to emit a first signal to the computing platform, said first signal being interpreted by the computing platform as a start-of-routing cycle instruction.

Such a system for routing objects by players allows, thanks to the electronic actuator, facilitating the start of a routing cycle.

More specifically, by simply pressing the electronic actuator, the player can launch a routing cycle without having to use the computer application on his computer unit.

Preferably, the object routing system also comprises:
a plurality of computer units held by players in a supply chain and each comprising second communication means intended to be paired with the first wireless communication means of a package, a computer application intended to be loaded by each computer unit, to allow an exchange of computer data between the computer units and the database(s).

The exchange of information between the package, the computing platform and the computer units is therefore easy and fast, even intuitive, for the player.

Advantageously, the computing platform is parameterized to issue a request to handle a package to at least one computer unit from a start-of-routing cycle instruction.

This in particular allows, by the sole action of a user on the electronic actuator, informing several players of the availability of a package for a routing mission.

In other words, the process of relating a player with a package is ensured by the computing platform which allows informing several members or several players at the same time.

Preferably, the database groups together:
departure coordinates of the package;
arrival coordinates of the package,
a series of first identification codes each associated with a package,
a series of second identification codes each associated with a player.

The identification of the packages and the identification of the players are thus dematerialized to facilitate and accelerate the handling of a package by a player.

According to one advantageous aspect, the computing platform is parameterized to associate an identification code of a package with an identification code of a player, from a start-of-cycle instruction and an acceptance of the handling request by a player via the computer application.

Such a parameterization of the computing platform allows, from the start of the cycle, that is to say as soon as the electronic actuator is pressed by a user, and after acceptance of the handling request by a player, that the package intended to route the object of the user is directly associated with a player so that he can receive the departure coordinates and the arrival coordinates of the package. The notification of these elements to the player can in particular be made through the computer application.

According to one preferred embodiment, each electronic actuator is coupled to the first wireless communication means to emit, to the computing platform, a second signal interpreted by the computing platform as a request to associate the identification code of a new player with the identification code of the package.

In case of change of player in charge of the package during its routing, the pressing by a player on the electronic actuator of the package then allows changing and transferring the responsibility for the package from a first player to a second player, without having to go through the application. Thus, the routing of the package is made smoother.

Advantageously, the database then also groups together, for each package, a responsibility code intended to identify the player transiently in charge of the package, and the computing platform is parameterized to receive a signal indicating that the player transiently in charge of the package has taken responsibility for the latter via the computer application contained in the computer unit that the player holds, and modify accordingly, with the identification code of said player, the responsibility code associated with the package.

This parameterization thus allows guaranteeing the safety of the package and therefore of the objects inside it. Indeed, the change of player being accompanied by the change of the responsibility code associated with the package, it is possible to track and trace the different players in charge of the package, in particular to allow identifying the person responsible for the package in case of difficulty or problem during the routing.

Preferably, the object routing system implements a blockchain programmed to authorize or deny the modification of the responsibility code associated with the package.

The use of a blockchain allows making the routing of packages more reliable. Indeed, a blockchain can only be modified for the addition of new data.

In other words, it is not possible to modify the blockchain to remove a past event, for example the handling and the association of responsibilities of a player having transferred or being supposed to have transferred the package to another player.

Thus, in case of problem during the routing of the package and of the objects, it is possible to find out who was the player responsible for the package at a given time, the latter being identified in the blockchain. The tracking of the responsibility is then guaranteed.

According to one preferred aspect, the computing platform is parameterized to transmit routing information to the players via the computer application.

This in particular allows the players to be able to obtain all the details of the routing related to them, without resorting to an exchange with other players or with a dedicated staff. This in particular allows temporarily leaving a package in a safe place for a transfer between two players when they are not available at the same time. The first player in charge of the package is then not forced to wait for the arrival of the other player to give him the information related to the routing of the package.

In addition, the routing data or information take the form of computer data and not physical data thus guaranteeing their integrity over time.

Advantageously, each package comprises a locking device which can adopt:
an open state, allowing access to the interior of the package,
a closed state, blocking access to the interior of the package,
the locking device being coupled to the first wireless communication means to transmit to the computing platform a third signal defining the open state or the closed state of the locking device.

Thanks to the coupling of the locking device with the first wireless communication means, it is possible to track at any time the open or closed state of the package. This in particular allows increasing the guarantee of the safety of the objects inside the package.

In addition, this also allows informing the players or even the sender and/or the recipient that the package has been opened without authorization, that is to say fraudulently.

In this case, the computing platform is advantageously parameterized to prohibit the start of a routing cycle when the third signal defines an open state of the locking device.

This guarantees the safety of the objects to be transported but also does not put the responsibility of the player in charge of the package at fault.

Indeed, if the package has not been closed upon launching the routing cycle, the object located inside the package may be removed or changed. The recipient of the parcel could then claim a fault on the part of one of the players during the transport of the object that led to the damage of the object or, worse, to the theft of the object.

Thanks to this third signal and to the prevention of the start of the routing cycle when the third signal defines an open state of the locking device, the safety is ensured on the fact that the object inside the package could not have been stolen or damaged on purpose by one of the players during the routing.

Preferably, the third signal is sent simultaneously to the first signal or nearly.

Simultaneously sending the third signal to the first signal allows smoothing the routing cycle.

Indeed, by simply pressing the electronic actuator, the handling request is sent to the players only if the package and in particular the locking device is in its closed state.

In other words, this allows avoiding false routing information given to a player who would then be caused to travel in order to take possession of a package while said package does not provide the guarantees necessary for the secure routing of the objects.

Advantageously, each computer unit comprises geolocation means likely to determine instantaneous geolocation coordinates of a package associated therewith.

Thanks to the geolocation means, it is possible to track the progress of the routing of the package.

In other words, the recipient or the sender of the package can track its progress and be reassured on the smooth progress of the routing.

In addition, this guarantees the availability of the recipient to receive his parcel since he can at any time know the position of the package and therefore make himself available to collect it safely.

It is also possible to track the evolution of the transit of the package during its routing to verify that it does not deviate from a predetermined route. In case of deviation, an alert can be given to the user, to the sender and/or to the recipient so that they can act and guard against any difficulty.

In addition, this allows, in particular for a safety service, being able to intervene quickly and safely in order to regain possession of the package that has deviated from its route or to inform the client, that is to say the recipient and/or the sender of an unexpected change in the trajectory of the package, related to an unexpected temporary disturbance.

Preferably, each package comprises a notification device and the platform is parameterized to trigger the notification device based on a predetermined action among which:
- a start of a routing cycle;
- an open state of the locking device;
- a modification of the responsibility code associated with the package.

The notification device thus allows an interaction with the or each player in charge of the package to inform him of a new state during the routing cycle.

Furthermore, this allows the player to avoid having to use his computer unit to consult, via the computer application, a change in the state of the routing, when the change is for example the validation of the change of responsibility code.

For example, when a change of responsibility or a change of route must be planned, the package can warn the player in charge of it so that he takes the necessary arrangements to act, when appropriate by consulting the computer application, in particular when the delivery coordinates have changed.

According to one preferred embodiment, the computer units belong to the following group:
- smartphones
- computer
- computer tablet.

Such computer units are generally mobile units allowing the player to be in permanent contact with the package during the routing.

Indeed, the computer units belonging to this group generally have components allowing direct communication with the computing platform and the package, by means specific thereto.

Other characteristics and advantages of the invention will emerge more clearly upon reading the following description of various preferred embodiments of the invention, given by way of illustrative and non-limiting examples, and the appended drawings, among which:

Figure 1:
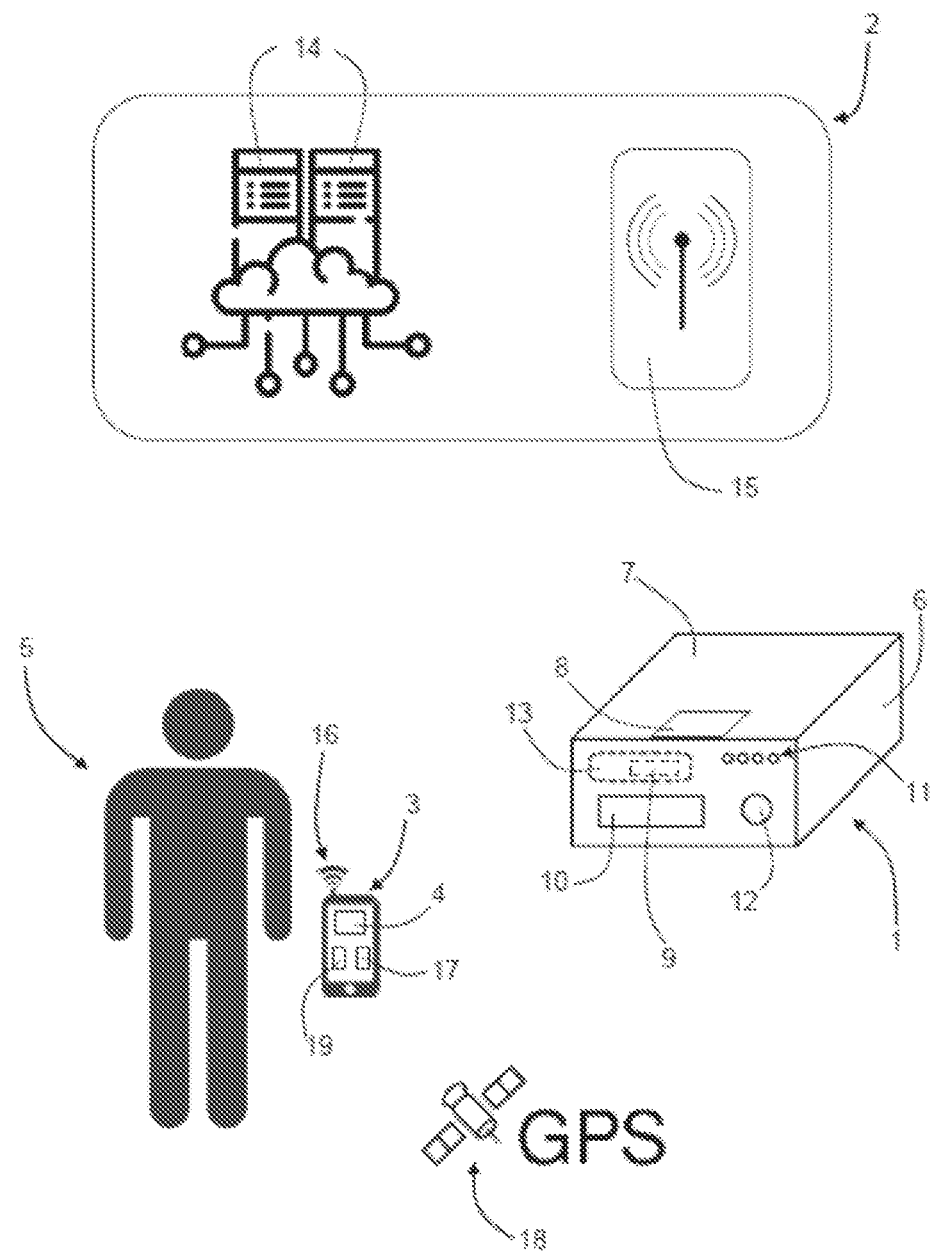
FIG. 1 is a schematic view representing a system for routing objects according to the invention.

As illustrated in FIG. 1, the object routing system according to the invention comprises:
- at least one package 1;
- a computing platform 2;
- a plurality of computer units 3;
- a computer application 4;

The object routing system also implements a community of players 5 of a supply chain to carry out the routing of the objects.

Each package 1 forms a container for transporting the objects. The package 1 thus comprises a box 6 defining an internal volume inside which at least one object to be transported is positioned, and a cover 7 intended to close the internal volume.

Each package 1 also comprises a locking device 8 allowing locking the cover 7 in a closed position of the internal volume so as to limit access to the internal volume and therefore to ensure the safety of the object(s) located in the internal volume.

More specifically, the locking device 8 of the package 1 can adopt:
- an open state, allowing access to the internal volume of the package 1, that is to say to the interior of the package 1;
- a closed state, blocking access to the internal volume of the package 1, that is to say to the interior of the package 1.

Each package 1 also integrates:
- first wireless communication means 9;
- a display device 10;
- at least one notification device 11;
- an electronic actuator 12.

The first communication means 9 are advantageously included in an artificial intelligence block 13 secured to a wall of the box 6 of the package 1.

The display device 10 is advantageously in the form of a screen allowing the display of a series of alphanumeric characters or any other pattern such as an image.

The notification device 11 is for its part in the form of at least one LED allowing emitting a light signal.

As illustrated in FIG. 1, the notification device 11 comprises four light-emitting diodes. However, the notification device 11 can comprise more or less than four light-emitting diodes.

Each light-emitting diode is advantageously of the RGB type, that is to say, they mainly emit the three primary colors, namely red (R), green (G) and blue (B). From these three primary colors, it is possible, by mixing them, to create a large number of colors.

Each diode can also emit a light signal of the same color as that of the other light-emitting diodes.

In other words, the notification emitted by the light-emitting diodes can take the form of a particular flashing without resorting to the use of a particular color.

In one variant, not illustrated, the notification device 11 can also take the form of an audible warning device, for example a loudspeaker.

According to another variant, not illustrated, the notification device 11 can be integrated into the display device 10, or in other words formed by the display device 10.

The electronic actuator 12 is in the form of a button, for example a push button, positioned on a face of the box 6 so that it can be actuated by a user or a player 5 from outside the package 1.

As described below, the electronic actuator 12 is coupled to the first wireless communication means 9 to emit a first signal to the computing platform 2. This first signal is then interpreted by the computing platform 2 as a start-of-routing cycle instruction.

The electronic actuator 12 is also coupled to the first wireless communication means 9 to emit, to the computing platform 2, a second signal interpreted by the computing platform 2 as a request to associate a player 5 with a package 1.

Furthermore, the locking device 8 is also coupled to the first wireless communication means 9 to transmit to the computing platform 2 a third signal defining the open state or the closed state of the locking device 8.

The computing platform 2 comprises at least one database 14 grouping together, for each package 1, information of a routing cycle in the form of computer data D1, D2, D3 . . . Dn.

The computing platform 2 further includes second wireless communication means 15 intended to communicate and to allow the exchange of computer data between the computing platform 2 on the one hand and the package 1 and/or the computer unit 3 on the other hand, as described below.

Each computer unit 3 is held by a player 5. More specifically, each player 5 holds a computer unit 5 grouping together personal data and allowing the player 5 to communicate with the package 1 on the one hand and with the computing platform 2 on the other hand.

For that, the computing platform 2 communicates with a computing cloud 2a allowing an exchange of data between several players 5 and the computing platform 2 as described below. The computing cloud 2a also allows the storage of data, in particular for offloading at least temporarily the information from the database 14.

Each computer unit 3 comprises third wireless communication means 16 intended to be paired with the first wireless communication means 9 of a package and with the second wireless communication means 14 of the computing platform 2.

As described above, each computer unit 3 is equipped with the computer application 4 loaded beforehand by the player 5 having the computer unit 3.

This computer application 4 allows in particular an exchange of computer data between the computer units 3 and the database(s) 4 of the computing platform 2.

As an indication, each computer unit 3 belongs to the following group:
smartphone;
computer;
computer tablet.

Computer units 3 of this group are in particular mobile, that is to say they can track the player 5 during his travels and in particular during the routing of each package 1 from a departure destination to an arrival destination.

Each computer unit 3 also comprises geolocation means 17 likely to determine instantaneous geolocation coordinates of a package 1 associated therewith.

More specifically, still according to FIG. 1, the geolocation means 17 allow exchanging with a geolocation system 18, for example comprising satellites, in order to determine, for example by triangulation, the exact position of the package 1 during its routing.

Each computer unit 3 further comprises a calculator 19 parameterized to compare the instantaneous geolocation coordinates with the departure coordinates and arrival coordinates of the package 1.

This allows defining a state of progress of the routing cycle and also tracking the routing of each package 1 in order to guarantee the safety of the objects that are inserted.

More particularly, in case of deviation from a predefined route, the calculator 19 allows informing the computing platform 2 and therefore each player 5 of the drift of one of the packages 1.

In one variant not illustrated in the figures, the geolocation means 17 are integrated into the packages 1. More particularly, each package 1 comprises geolocation means 1. The packages 1 can thus communicate directly with the computing platform 2 to allow the tracking of the position of each package 1.

The comparison of the instantaneous geolocation coordinates with the departure coordinates and arrival coordinates of the package 1 is then made by the computing platform 2.

Figure 2:
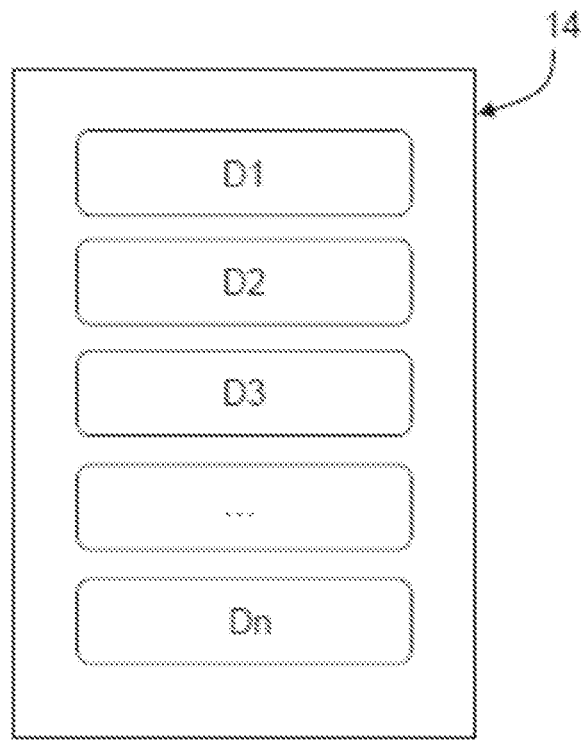
FIG. 2 is a schematic view representing the different data recorded in the databases of a computing platform of the object routing system according to the invention.

With reference to FIG. 2, each database 14 integrates for each package 1:
the departure coordinates of the package 1 corresponding to a routing cycle;
the arrival coordinates of said package 1 corresponding to the same routing cycle;
an identification code for each package 1;
an identification code for each of the players 5;
a responsibility code associated with each package 1.

Thus, for each package 1, the database 14 comprises an identification code of the package 1 associated with a responsibility code of the latter.

Figure 3:
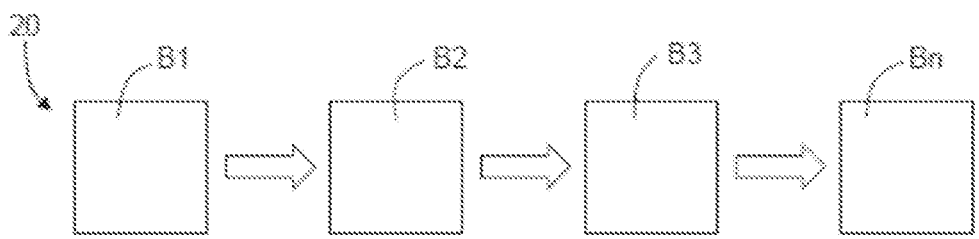
FIG. 3 is a schematic view of a blockchain used by a computing cloud of the computing platform.

FIG. 2 describes a blockchain 20 whose writing, that is to say the addition of a new block, is done sequentially. As illustrated in FIG. 3, when a first block B1 is validated, a second block B2 can be created and positioned after the first block B1, then a third block B3, up to a last block BN. The last block BN is then the block that is in a valid state, that is to say the block whose information contained therein, if verified, is true.

Such a blockchain 20 offers an advantage in terms of security since when a block is inserted into the blockchain 20, it is validated, that is to say, it can no longer be modified.

In other words, as illustrated schematically in FIG. 3, the blockchain 20 can only move from left to right, that is to say along the direction of the arrows and not in the opposite direction.

A previous block can therefore be read only and can no longer be modified, which promotes the tracking and the traceability of the information contained in each block 20.

Furthermore, the blockchain 20 is only accessible to the players who implement it, that is to say, to the players 5.

The computing platform 2 is parameterized to digitally track the time-stamped geolocation of each package 1 from a start-of-routing cycle instruction.

The computing platform 2 is also parameterized to issue a request to handle a package 1 to at least one computer unit 3 from a start-of-routing cycle instruction, as described below.

The computing platform 2 is furthermore parameterized to associate an identification code of a package 1 contained in one of the databases 14 with an identification code of a player 5.

The computing platform 2 is furthermore parameterized to receive a signal indicating that a player transiently in charge of the package 1 has handled and taken responsibility for the latter, for example via the computer application 4 contained in the computer unit 3 that the player 5 holds, and modify accordingly, with the identification code of said player 5, the responsibility code associated with the package 1.

This association is made from a start-of-routing cycle instruction and an acceptance of the handling request by a player 5, in particular via the computer application 4 as explained below.

The computing platform 2 is still parameterized to transmit routing information to the players 5, in particular via the computer application 4.

More specifically, the computing platform 2 is parameterized to transmit to the player 5 in charge of a package 1 the routing information related to said package 1.

The computing platform 2 is furthermore parameterized to prohibit the start of a routing cycle when the second signal defines an open state of the locking device 8.

Referring to FIGS. 4 to 8, use cases are now described.

Figure 4:
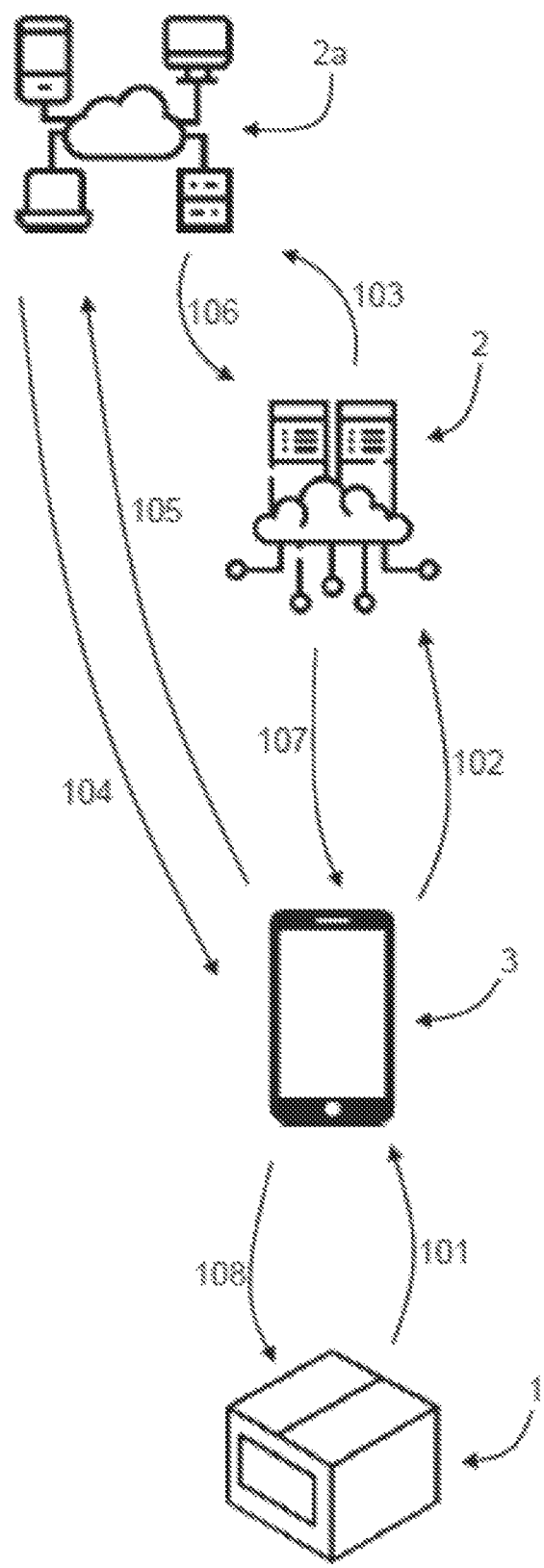
FIG. 4 to FIG. 8 illustrate different cases of use of the object routing system according to the invention.

In a first case, illustrated by FIG. 4, a recipient having received a package 1 wishes to get rid of said package 1.

For that, the recipient who then becomes a user, actuates or acts on the electronic actuator 12 of the package 1. The first communication means 9 of the package 1 then emit a first signal to the computing platform 2, the latter interpreting this first signal as a start-of-cycle instruction.

More specifically, the first signal is emitted by the first wireless communication means 9 towards the computer unit 3 via a first communication channel 101. The computer unit 3 transfers this first signal to the computing platform 2 via a second communication channel 102.

Subsequently, the computing platform 2 issues towards the computing cloud 2a, a request for removal via a third communication channel 103.

The computing cloud 2a communicating with all the computer units 3 transfers this request to the computer units 3 via a fourth communication channel 104.

Each player then receives the request and accepts or not to handle the package 1.

Preferably, the computing cloud 2a comprises calculators allowing targeting the computer units 3 located in a predetermined geographical perimeter around the package 1 to be routed. Thus, only the computer units 3 located in this geographical perimeter will receive the request for removal.

When a player 5 accepts handling the package 1, he informs the computing platform 2. This is done in particular via the computer application 4 and in particular through the transmission of a signal via a fifth communication channel 105 between the computer unit and the computing cloud 2a then a sixth communication channel 106 between the computing cloud 2a and the computing platform 2.

In case several players 5 accept the handling of the package, the first of the players 5 having accepted the handling will be the one recognized by the computing platform 2.

The computing platform 2 then records in the databases 14 the information on the handling by the player 5.

More specifically, the computing platform 2 associates the identification code of the package 1 with the identification code of the player 5. Furthermore, the computing platform 2 modifies the responsibility code associated with the package 1 as a function of the identification code of the player 5 who has accepted the handling of the package 1.

The computing platform 2 then transmits the routing data of the package 1 to the player 5 who has accepted the handling. This transmission takes place in particular via a seventh communication channel 107 between the computing platform 2 and the computer application 4 loaded in the computer unit 3 of the player 5.

The computer unit 3 transmits a signal to the package 1 in order to notify the player 5, via the package 1, of the acceptance and the start of the routing cycle.

This notification is in particular made by means of the light-emitting diodes and in particular a green flashing diode to notify a change of status in the routing of the package 1.

More particularly, this signal transmission is performed between the second wireless communication means 15 of the computer unit 3 and the first wireless communication means 9 of the package 1.

Furthermore, one or several pieces of information can also be sent by the computer unit 2 to the package 1, this information being able to be displayed on the display device 10.

Figure 5:
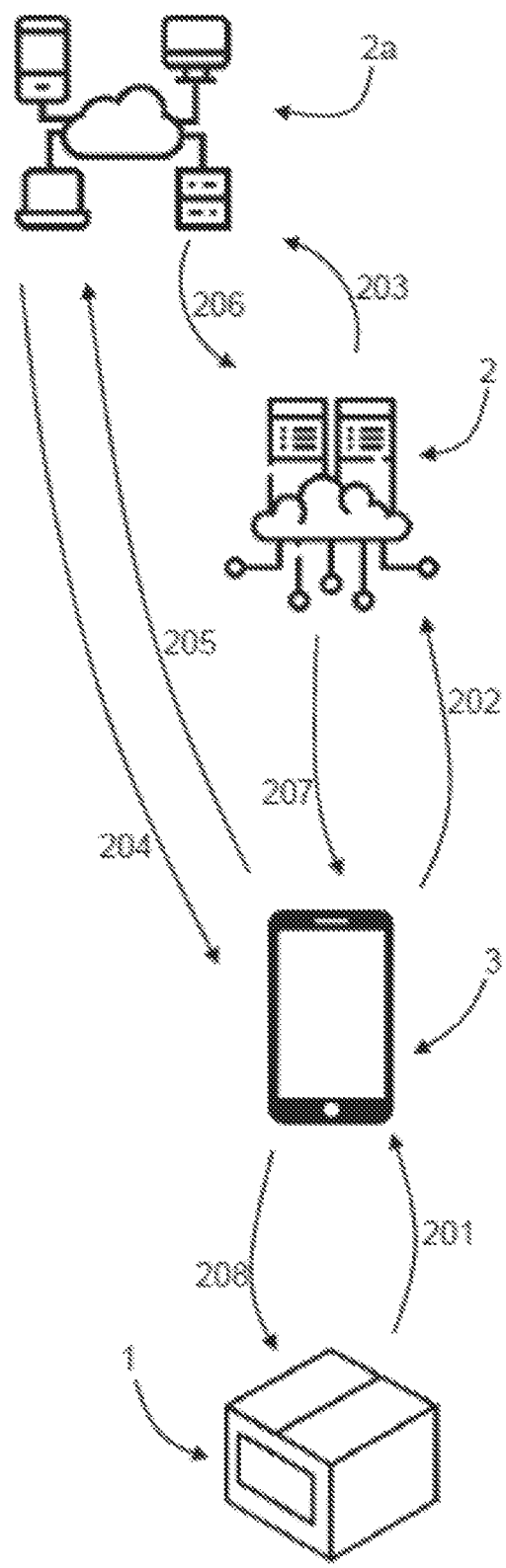

In a second case, illustrated in FIG. 5, the recipient of a package 1 wishes to return a product or an object contained in the package 1, or another object.

In this case, the user actuates the electronic actuator 12 so as to notify the computing platform 2 of a start-of-routing cycle instruction via the first signal.

The package 1 communicates via a first communication channel 201 said signal to the computer unit 2.

The computer unit 2 transfers, via a second communication channel 202, the signal up to the computing platform 2.

The computing platform 2 transforms then transfers the first signal into a return request to the computing cloud 2a, via a third communication channel 203.

Said return request is transmitted to the players 5 via a fourth communication channel 204.

A player 5 then decides to handle the package 1 and notifies it via the computer application 4 to the computing cloud 2a via a fifth communication channel 205. The computing cloud 2a transmits this acceptance of handling the package to the computing platform 2 via a sixth communication channel 206. The status of the package 1 is then "waiting" to return.

The computing platform 2 then accordingly modifies the responsibility code associated with the package 1.

The computing platform 2 then transmits data of the handling of the package 1 to the player 5 having accepted this handling via a seventh communication channel 207.

As an indication, the data may comprise the location coordinates of the removal of the package 1 as well as the destination coordinates.

The computer unit 3 of the player 5 having accepted the handling of the package 1 emits a signal to the package 1, via an eighth communication channel 208. This signal allows in particular the package 1 to notify the player 5 in charge of it of the status change and in particular the association and the modification of the responsibility code of the package 1 with the identification code of the player 5. This can in particular result in a green flashing of one of the LEDs of the package 1.

Figure 6:
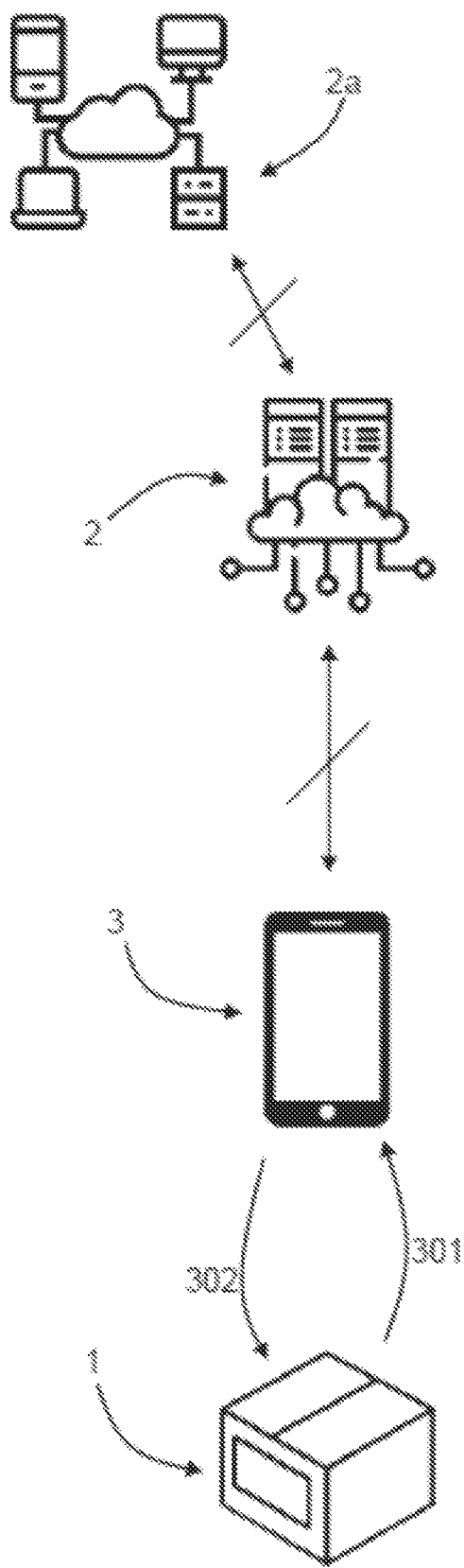

FIG. 6 illustrates a third case in which it is impossible to choose the action to be triggered.

In other words, pressing the electronic actuator 12 does not allow launching a cycle since, in this case, the cycle has not been completely defined beforehand.

In this configuration, the user presses the electronic actuator 12. The package 1 and in particular the first wireless communication means 9 transmit the first signal towards the computer unit 3 via a first communication channel 301.

The computer unit 3 then detects that the information entered previously for the configuration of the package 1 does not match or does not allow performing a correct routing. For example, the lack of information can lie in one at least of the following reasons:

absence of departure coordinates;
absence of arrival coordinates;
absence of identification of the recipient;

absence of identification of the sender;

absence of categorization of the object to be routed.

The computer unit 3, by means of the computer application 4, then cannot transmit information to the computing platform 2 and then returns a signal to the package 1 via a second communication channel 302. The package 1 translates the signal received by an orange flashing of one of the light-emitting diodes and/or the display of a message on the display device 10 of the package.

As an indication, the message displayed on the package can be: "connect to the application" or "connect to the application to fill in the missing information".

Figure 7:
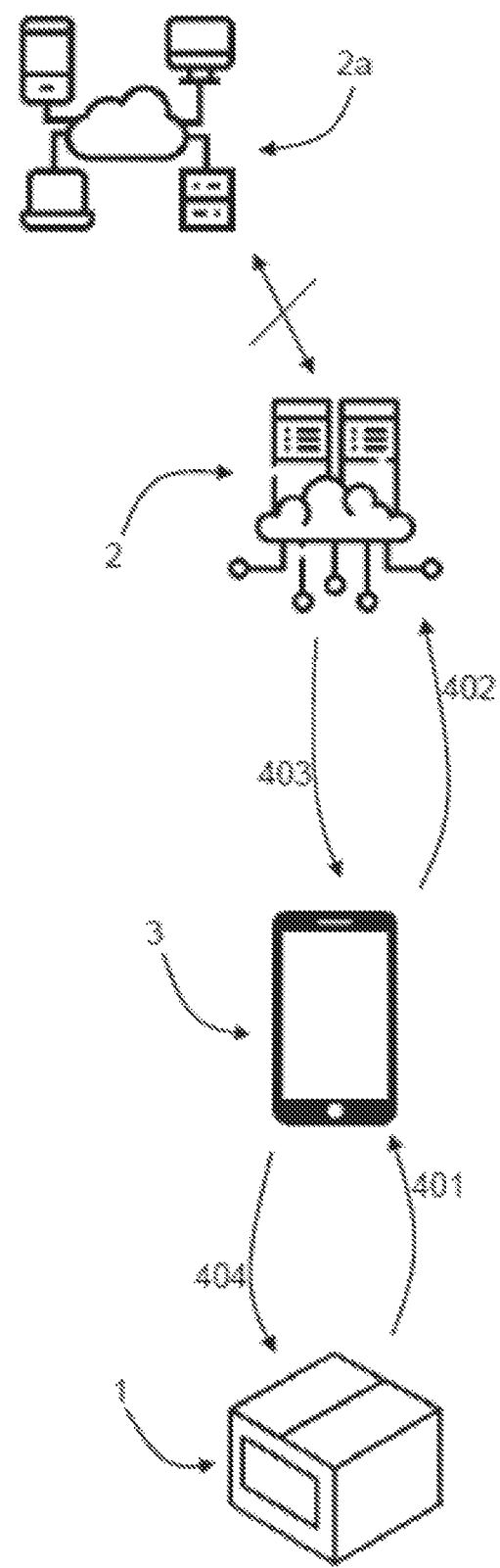

According to a fifth case illustrated in FIG. 7, the user brings the package 1 that he has just received to a storage place for later use by another user.

In this case, the user presses the electronic actuator 12. The package 1 then emits a signal following a first communication channel 401 to the computing platform 2.

More specifically, the signal is emitted towards the computer unit 3 which detects and transforms the signal to the computing platform 2 and transmits a "return for storage" order to the computing platform 2 via a second communication channel 402.

The computing platform 2 then processes this signal to determine a place of delivery of the package 1 for storage.

The place of delivery of the package is in particular determined based on the geolocation coordinates of the package 1 when the user presses the electronic actuator 12.

When the place of delivery of the package 1 is determined, the computing platform 2 transfers or emits a signal to the computer unit 3 via a third communication channel 403.

The computer unit 3 then transfers this signal to the package 1 via a fourth communication channel 404 between the first wireless communication means 9 and the second wireless communication means 15.

The signal is translated by the artificial intelligence block 13 of the package 1 so that the display device 10 displays the coordinates of the place of delivery of the package 1 to the user.

The user then travels to drop off the package 1 at the place of delivery indicated on the package 1 and can validate the delivery either via the computer application 4 of his computer unit 4, or by pressing the electronic actuator 12.

If it acts on the electronic actuator 12, the package 1 transmits a signal to the computing platform 2 with the geolocation coordinates of the package 1 which are then compared with the coordinates in the place of delivery to validate the delivery.

A reward system can also be set up, allowing the user to obtain one or more point(s) for having delivered the package 1 after use. This is in particular in line with the low impact of the routing system on the environment. Indeed, by delivering the package 1, it is not destroyed and can be reused.

In addition, this embodiment allows both retaining the clients but also tracking the trust of the players 5, that is to say rating the players 5 in order to determine a trust index.

This trust index can then be used by the computing platform 2 based on the information entered by the user on the content of the packages 1, in particular in case of valuable content. Indeed, a package 1 will be entrusted to players 5 having a minimum trust index. Thus, this avoids any risk of losing or damaging the package 1 and therefore the objects it contains.

Figure 8:
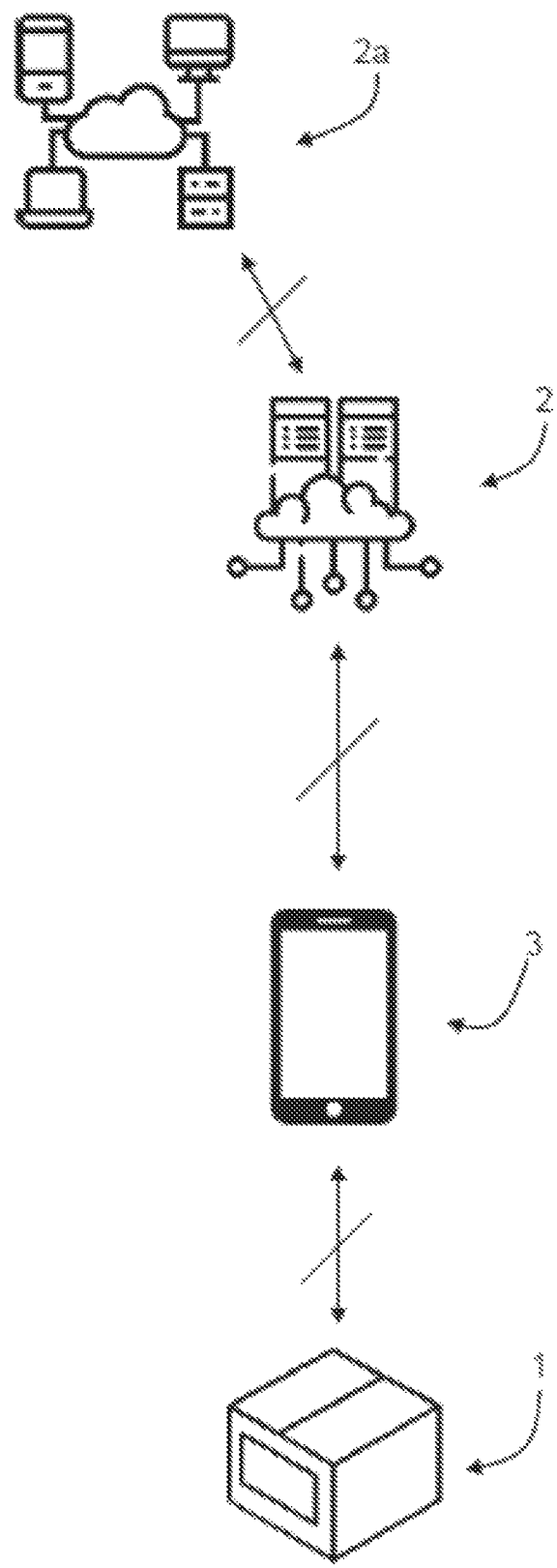

FIG. 8 illustrates a fifth use case in which no computer unit 3 is connected to the package 1.

The user then presses the electronic actuator 12. The package 1 then wishes to emit the first signal towards the computer unit 3, but this first signal cannot be successful given that no computer unit 3 is associated with the package 1.

After a predetermined waiting time, the package 1, via the light-emitting diodes, emits a signal to the user. This signal for example takes the form of a red flashing of one of the light-emitting diodes. An error message may also be displayed on the display device 10 of the package 1.

The object routing system just described has many advantages.

The main advantage lies in the fluidity of the routing of the objects, or at the very least, in the smooth execution of the instructions.

Indeed, it is no longer necessary for a user to connect frequently or recurrently to the computer application 4 or to a website in order to be able to order and start a routing cycle. Pressing the electronic actuator 12 indeed allows eliminating these interactions with the computer application 4 or a website.

By pressing the electronic actuator 12, it is then possible to launch a cycle or to interact with the package 1 or the computing platform 2 during the routing cycle.

Another advantage lies in the fact that the transport and routing of an object from the departure coordinates up to the arrival coordinates is secure.

The association of identification codes of the package 1, of identification codes of the players 5 and of responsibility codes allows offering a complete traceability of the routing of the objects and in particular of the responsibility for the objects and packages 1.

Furthermore, the use of a blockchain system 20 secures the routing especially when the information of a block is added to the blockchain 20, it is no longer possible to modify them. In other words, if a player has bad intentions for the package 1 and its content, he will not be able to erase the traces of his possession of the package 1.

The geolocation means 17 further allow instantly tracking the positioning of the package 1 and therefore ensuring a real-time tracking of the package 1.

The computer unit 3 which comprises time-stamping means, for example a clock, allows providing details at each change of status of the package 1.

By "change of status", it is in particular meant the passage of a package 1 from a storage state to a use state, the holding of the package by a player 5, the transfer of the package 1 from a first player 5 to a second player 5 and the modification of the responsibility code associated with the package, or the arrival at specific points of routing of the package 1 such as for example the arrival point or an imposed control point.

In addition, the opening of the package 1 can be blocked when a routing cycle is initiated. For that, the computing platform is parameterized to emit a signal to the package, this signal being interpreted by the package 1 as a blocking signal for the locking device 8 in its closed position. The unblocking of the locking device 8 can then be achieved automatically at the end of the routing cycle, or through the emission of a signal by the computing platform 2.

The parameterization of the computing platform can be performed so as to block the locking device 8 in specific locations or during predetermined steps of the routing.

In addition, the package 1 can comprise different sensors such as temperature sensors, humidity sensors, acceleration sensors, cameras, pressure sensors, in particular for continuously recording different actions applied to the package.

Several use cycles of the routing system can be in particular provided, for example:
- a first cycle of routing of an object comprising a collection step, a travel step and a distribution step;
- a second cycle called reuse cycle in which the package is transmitted to be stored by a transporter with a view to be reused for a routing action, for example;
- a third return cycle in which the recipient of an object immediately reuses the package which then follows a first collection step, a travel step and a distribution step.

According to a particular embodiment, the electronic actuator 12 also allows sending a signal notifying the end of a routing cycle in which a confirmation for receipt of the package, for acceptance of the package or again for payment of taxes, for example, is notified to the computing platform 2 and therefore to the different players 5 and more particularly to the sender of the package.

Advantageously, the package 1 includes a battery allowing keeping active the electronic means such as the first wireless communication means 9, the geolocation means 17 if they are integrated into the package 1, the display device 10 and the notification device 11.

Another advantage of this routing system lies in its low impact on the environment. Indeed, the packages can be reused for the routing of a new object and in particular comprise wireless geolocation and communication means allowing, so that in case of unauthorized abandonment of the package, the latter can be found easily and quickly.

Finally, the object routing system is more reliable than a conventional system since, in case of damage during the routing of one of the packages 1, only the affected package 1 will be able to have its delivery delayed, unlike a conventional system in which several packages are transported at the same time. Indeed, for a conventional routing system, if, for example, the means of transportation break down, all the cargo, that is to say all the packages contained in the means of transportation, will be delivered with a delay. However, this is only valid at the end of the routing cycle when the player 5 is an individual from a community or an individual person taking advantage of the opportunity of his personal travel to route a package 1.

On the other hand, for the other parts of the routing cycle, the packages 1 are mass transported, that is to say several at a time. Thus, in case of damage during transport, all the packages 1 are affected at the same time.

The invention claimed is:

1. A system for routing objects, comprising:
packages integrating first wireless communication means;
a computing platform including at least one database grouping together, for each package, information of a routing cycle;
the computing platform being parameterized to digitally track the time-stamped geolocation of each package from a start-of-routing cycle instruction,
wherein each package carries an electronic actuator coupled to the first wireless communication means in order to emit a first signal to the computing platform, said first signal being interpreted by the computing platform as a start-of-routing cycle instruction, wherein the start-of-routing cycle instruction comprises a removal request,
wherein each package comprises a locking device which can adopt:
an open state, allowing access to the interior of the package,
a closed state, blocking access to the interior of the package,
wherein the locking device is coupled to the first wireless communication means to transmit to the computing platform a third signal defining the open state or the closed state of the locking device, and
wherein the third signal is sent simultaneously to the first signal.

2. The object routing system according to claim 1, further comprising:
a plurality of computer units held by players in a supply chain and each comprising second communication means intended to be paired with the first wireless communication means of a package, a computer application intended to be loaded by each computer unit, to allow an exchange of computer data between the computer units and the database(s).

3. The object routing system according to claim 2, wherein the computing platform is parameterized to transmit routing information to the players via the computer application.

4. The object routing system according to claim 2, wherein each computer unit comprises geolocation means capable of determining instantaneous geolocation coordinates of a package associated therewith.

5. The object routing system according to claim 4, wherein each computer unit comprises a calculator parameterized to compare the instantaneous geolocation coordinates with the departure coordinates of the package and the arrival coordinates of the package, and define a state of progress of the routing cycle.

6. The object routing system according to claim 2, wherein the computer units belong to the following group:
smartphones
computer
computer tablet.

7. The object routing system according to claim 1, wherein the computing platform is parameterized to issue a request to handle a package to at least one computer unit from a start-of-routing cycle instruction.

8. The object routing system according to claim 7, wherein the computing platform is parameterized to associate an identification code of a package with an identification code of a player, from a start-of-cycle instruction and an acceptance of the handling request by a player via the computer application.

9. The object routing system according to claim 8, wherein the database also groups together, for each package, a responsibility code intended to identify the player transiently in charge of the package, and in that the computing platform is parameterized to receive a signal indicating that the player transiently in charge of the package has taken responsibility for the latter via the computer application contained in the computer unit that the player holds, and modify accordingly, with the identification code of said player, the responsibility code associated with the package.

10. The object routing system according to claim 9, wherein the object routing system implements a blockchain programmed to authorize or deny the modification of the responsibility code associated with the package.

11. The object routing system according to claim 1, wherein the database groups together:
departure coordinates of the package;
arrival coordinates of the package;
a series of first identification codes each associated with a package,
a series of second identification codes each associated with a player.

12. The object routing system according to claim 11, wherein each electronic actuator is coupled to the first wireless communication means to emit, to the computing platform, a second signal interpreted by the computing platform as a request to associate the identification code of a new player with the identification code of the package.

13. The object routing system according to claim 1, wherein the computing platform is parameterized to prohibit the start of a routing cycle when the third signal defines an open state of the locking device.

14. The object routing system according to claim 1, wherein each package comprises a notification device and in that the computing platform is parameterized to trigger the notification device based on a predetermined action among which:
- a start of a routing cycle;
- an open state of the locking device;
- a modification of the responsibility code associated with the package.

15. A package forming a container for transporting objects, the package integrating:
first wireless communication means; and
an electronic actuator coupled to the first wireless communication means in order to emit a first signal to a computing platform, said first signal being interpreted by the computing platform as a start-of-routing cycle instruction of the package, wherein the start-of-routing cycle instruction comprises a removal request,
wherein the package comprises a locking device which can adopt:
- an open state, allowing access to the interior of the package,
- a closed state, blocking access to the interior of the package,
wherein the locking device is coupled to the first wireless communication means to emit a third signal to the computing platform, said third signal defining the open state or the closed state of the locking device, and
wherein the third signal is emitted simultaneously to the first signal.

* * * * *